United States Patent
Eck et al.

(10) Patent No.: US 10,782,655 B2
(45) Date of Patent: Sep. 22, 2020

(54) COMPOSABLE TIME-SERIES OBSERVABILITY IN SENSOR DATA FUSION

(71) Applicant: INTERNATIONAL BUSINESS MACHINES COPORATION, Armonk, NY (US)

(72) Inventors: Bradley Eck, Carpenterstown (IE); Francesco Fusco, Maynooth (IE); Seshu Tirupathi, Phoenix Park Racecourse (IE)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/010,434

(22) Filed: Jun. 16, 2018

(65) Prior Publication Data
US 2019/0384235 A1    Dec. 19, 2019

(51) Int. Cl.
G05B 13/02    (2006.01)
H02J 3/38    (2006.01)

(52) U.S. Cl.
CPC ............ *G05B 13/028* (2013.01); *H02J 3/383* (2013.01); *H02J 2203/20* (2020.01)

(58) Field of Classification Search
CPC .... G05B 13/028; H02J 3/383; H02J 2003/007
See application file for complete search history.

(56) References Cited

U.S. PATENT DOCUMENTS 5,321,613 A    6/1994    Porter
6,801,878 B1 *    10/2004    Hintz .................... H04L 41/00
                                                                702/188
7,698,108 B2    4/2010    Haney
(Continued)

FOREIGN PATENT DOCUMENTS

CN    104753066 A  *  7/2015

OTHER PUBLICATIONS

Baron, et al., "Bayesian Compressive Sensing Via Belief Propagation", IEEE Transactions on Signal Processing, vol. 58, No. 1, Jan. 2010 (Year: 2010).*

(Continued)

*Primary Examiner* — Thomas C Lee
*Assistant Examiner* — Michael Tang
(74) *Attorney, Agent, or Firm* — Kurt Goudy; Otterstedt, Wallace & Kammer, LLP

(57) ABSTRACT

A sensor data fusion system includes a processor coupled to a plurality of sensors. The system is initialized by providing access to a data store storing at least one time series of sensor data; a semantic store storing semantic data including system variables, and relations between the system variables; and a mapping therebetween. A registration of a set of one or more variables of interest for which appropriate data is not available is obtained. An initially empty inference model is extended with the set of variables, to obtain an extended model. A request to observe a given one of the set of variables at a given timestamp is obtained. Responsive thereto, time series data for the set of registered variables is retrieved. The extended model is run with the retrieved data to obtain an estimate of the given one of the variables at the given timestamp.

13 Claims, 3 Drawing Sheets

(56) References Cited

U.S. PATENT DOCUMENTS

| | | | |
|---|---|---|---|
| 2011/0153276 A1* | 6/2011 | Lee | G06F 3/038 |
| | | | 702/188 |
| 2013/0096831 A1* | 4/2013 | Chan | H04W 4/38 |
| | | | 702/1 |
| 2013/0159223 A1* | 6/2013 | Bahl | G01D 1/00 |
| | | | 706/12 |
| 2014/0032167 A1 | 1/2014 | Mayer | |
| 2014/0214726 A1* | 7/2014 | Minato | G05B 15/02 |
| | | | 705/400 |
| 2015/0186777 A1 | 7/2015 | Lecue | |
| 2016/0171037 A1 | 6/2016 | Mathur | |
| 2017/0060988 A1 | 3/2017 | Kudo | |
| 2017/0109841 A1* | 4/2017 | Sadikovic | G05F 1/66 |
| 2018/0144034 A1* | 5/2018 | Das | H04W 84/18 |
| 2019/0104493 A1* | 4/2019 | Hedley | G01S 5/0273 |

OTHER PUBLICATIONS

Federico Castanedo, "A Review of Data Fusion Techniques," The Scientific World Journal, vol. 2013, Article ID 704504, 19 pages, 2013. doi:10.1155/2013/704504.

Park, SK and Xu L. "Data Assimilation for Atmospheric, Oceanic and Hydrologic Applications", Springer, 2009 pp. I-XVIII, 1-84.

Bahador Khaleghi, Alaa Khamis, Fakhreddine O. Karray and Saiedeh N. Razavi, Multisensor data fusion: A review of the state-of-the-art, Information Fusion, vol. 14, Issue 1, 2013, 28-44.

Richard C Wilson et al., Relational Matching with Dynamic Graph Structures, Proceedings of IEEE International Conference on Computer Vision Jun. 20-23, 1995 pp. 450-456.

Jianzhong Wu, et al., A Robust State Estimator for Medium Voltage Distribution Networks 0885-8950 2012 IEEE, 9 pages.

* cited by examiner

COMPOSABLE TIME-SERIES OBSERVABILITY IN SENSOR DATA FUSION

TECHNICAL FIELD

The present invention relates to the electrical, electronic, and computer arts, and more specifically, to sensor networks and related technologies.

BACKGROUND

The growing availability of sensing devices and internet of things (IoT) systems creates a huge potential for making data and analytics the driver of value and competitiveness in many fields. Most of the time spent in the development and deployment of any data analytics module or data science project is spent on the tasks of understanding the data, the relation of the data to the domain variables, and designing the appropriate data transformation pipelines. Knowledge of the data and relations to the domain variables is typically dispersed among various domain experts in an inconsistent and non-transferrable way.

The knowledge accumulated in a data science project, in the form of data transformation pipelines, is typically difficult to transfer to other projects or business decision-making processes. As a result, the potential value in the data is not fully, and often poorly, exploited.

SUMMARY

Embodiments of the present disclosure provide techniques for composable time-series observability in sensor data fusion. According to an embodiment of the present invention, an exemplary method for improving the performance of a sensor data fusion system including a processor coupled to a plurality of sensors and having limited sensor resources includes initializing the sensor data fusion system by providing access to: a data store storing at least one time series of sensor data; a semantic store storing semantic data including system variables, and relations between the system variables; and a mapping between the semantic data and the time series of sensor data; obtaining, from a user, a registration of a set of one or more variables of interest defined in the semantic store but for which appropriate data is not available due to the limited sensor resources; and extending an initially empty inference model with the set of one or more variables of interest, to obtain an extended inference model. The method further includes obtaining, from the user, a request to observe a given one of the set of one or more variables of interest at a given timestamp; responsive to the request, retrieving time series data for the set of registered variables in the extended inference model; and running the extended inference model with the retrieved data to obtain an estimate of the given one of the set of variables at the given timestamp.

According to another embodiment of the present invention, an exemplary method for controlling the operation of an electrical power system includes initializing a sensor data fusion system including a processor coupled to a plurality of sensors, and having limited sensor resources, by providing access to: a data store storing at least one time series of sensor data; a semantic store storing semantic data including system variables, and relations between the system variables; and a mapping between the semantic data and the time series of sensor data. At least one of the system variables includes voltage at a feeder head in a substation. The feeder head is coupled to a plurality of feeders with loads and distributed generation capability. A further step includes obtaining, from a user, a registration of a set of one or more variables of interest defined in the semantic store but for which appropriate data is not available due to the limited sensor resources. The set of one or more variables of interest includes at least the voltage at the feeder head. Further steps include extending an initially empty inference model with the set of one or more variables of interest, to obtain an extended inference model; and obtaining, from the user, a request to observe a given one of the set of one or more variables of interest at a given timestamp. The given one of the set of one or more variables of interest includes at least the voltage at the feeder head. Still further steps include, responsive to the request, retrieving time series data for the set of registered variables in the extended inference model; running the extended inference model with the retrieved data to obtain an estimate of the given one of the set of variables at the given timestamp; and controlling the operation of the electrical power system in accordance with the estimate of the given one of the set of variables at the given timestamp.

According to a further embodiment of the present invention, an exemplary computer implementing a sensor data fusion system includes a memory; and at least one processor, coupled to the memory, and having interfaces with a plurality of sensors having limited sensor resources. The at least one processor is operative to: initialize the sensor data fusion system by providing access to: a data store storing at least one time series of sensor data; a semantic store storing semantic data including system variables, and relations between the system variables; and a mapping between the semantic data and the time series of sensor data. The at least one processor is further operative to obtain, from a user, a registration of a set of one or more variables of interest defined in the semantic store but for which appropriate data is not available due to the limited sensor resources; extend an initially empty inference model with the set of one or more variables of interest, to obtain an extended inference model; obtain, from the user, a request to observe a given one of the set of one or more variables of interest at a given timestamp; responsive to the request, retrieve time series data for the set of registered variables in the extended inference model; and run the extended inference model with the retrieved data to obtain an estimate of the given one of the set of variables at the given timestamp.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Transparent retrieval of data representing high-level concepts or variables of a system or domain, by hiding the complexity of identifying the relevant raw sensor data and applying the required transformation (e.g. data cleaning and aggregation), thus resulting in maximal usage of often difficult-to-use data in a data-driven decision-making process;

Democratization of data engineering process and data access by empowering all types of users to easily quantify variables resulting from complex data transformation pipelines, and/or to extend data engineering rules;

Reduced cost of entry for creating data-set for data-science or process control;

Enable transfer and reuse of knowledge across an enterprise or collective of users, in the form of data transformation pipelines.

These and other features and advantages of the present invention will become apparent from the following detailed description of illustrative embodiments thereof, which is to be read in connection with the accompanying drawings.

DETAILED DESCRIPTION

As noted, the growing availability of sensing devices and internet of things (IoT) systems creates a huge potential for making data and analytics the driver of value and competitiveness in many fields. Most of the time spent in the development and deployment of any data analytics module or data science project is spent on the tasks of understanding the data, the relation of the data to the domain variables, and designing the appropriate data transformation pipelines. Knowledge of the data and relations to the domain variables is typically dispersed among various domain experts in an inconsistent and non-transferrable way.

The knowledge accumulated in a data science project, in the form of data transformation pipelines, is typically difficult to transfer to other projects or business decision-making processes. As a result, the potential value in the data is not fully, and often poorly, exploited.

One or more embodiments advantageously provide a system which computes observations of system variables ("observe" aspect) by running an inference model derived from analytical relations between requested variables and other known variables, and from a mapping between variables and sensor observations. The answer can be, for example:

The estimate of the requested observations;

"Variable is unobservable"—missing analytic relations or sensor data required to make query observable are also returned.

One or more embodiments maintain and extend a set of analytic relations between variables and mapping to sensor observations by:

Receiving registrations of new "variables" and semantic relations;

Receiving new analytical relations between variables, or mapping between variables and observations; and/or Learning new analytical relations between variables from the data, exploiting semantic relations.

One or more embodiments employ data and semantic modeling tools; a machine learning inference model; an analytics engine; and one or more machine learning modules. The data and semantic modelling tools manage sensor data, variables and semantic relations. The machine learning inference model represents the analytics relations between variables. The analytics engine is configured to interpret analytics relations and run inference(s) on the inference model. Non-limiting examples of analytic relations include: deterministic functions, joint/conditional probability distributions, and the like. The machine learning modules are configured to learn new analytics relations.

One or more embodiments make use of a definition of a set of variables describing the system, and a mapping between variables and sensor observations.

Figure 1:
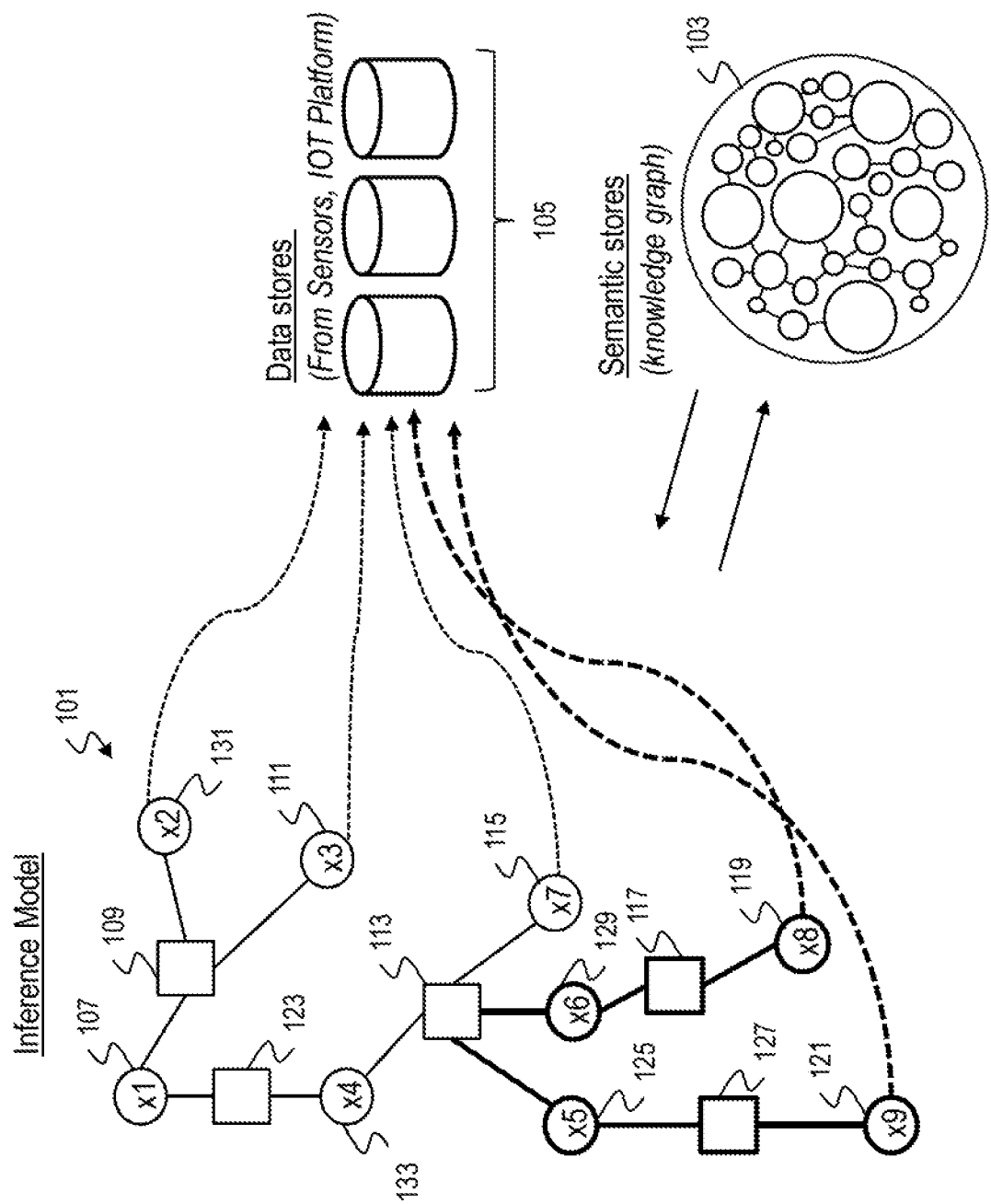
FIG. 1 presents a combined flow chart and block diagram, according to an aspect of the invention.

Referring now to FIG. 1, in one or more embodiments, considering initialization, the system has access to a time series data store 105 (e.g. sensor data), a semantic store 103 (system entities, variables, relations) and a mapping between semantic data and time series data (dashed lines). During system extension, the user registers a set of variables of interest. Optionally, the user registers known analytic relations between variables. Examples of analytic relations could be functional relations, parametric joint densities (mean/covariance matrix), and the like. The system extends the inference model (empty at start) with the given variables of interest and analytic relations. Where no analytic relations exist to link registered variables with existing variables, the system navigates the semantic store to identify new relationships and associates a parametric relation (e.g. a joint/conditional density) to each relation. The system then learns the parameters of the new analytic relations by extracting historical data from the time series data store. For example, if the inference model is a probabilistic graphical model, maximum likelihood can be used to infer the parameters from the data. Where data for some of the registered variables with unknown relations are not available, the system flags that variable as "unobservable". The user can then provide the relations or provide a mapping from variable to data from a new sensor.

The terms "entities" and "variables" are used essentially interchangeably herein, and will be understood to refer to high level concepts that it is desired to quantify. The relations in the semantic store 103 are relations between the entities/variables.

Regarding system queries (observe phase), the user requests to observe a variable at a given timestamp. The system retrieves time series data for all variables in the inference model. The system then runs the inference model and returns the "optimal" estimate of the requested variable given the timeseries data and the model relationships, where the optimality criterion could be, for example, maximum likelihood or maximum a posteriori. For example, if the inference model is a probabilistic graphical model, belief propagation could be used to run the inference.

Still referring to FIG. 1, inference model 101 includes analytic relations 109, 123, 113, 117, 127 symbolized by square boxes and variables x1 through x9 symbolized by circles and numbered, respectively, 107, 131, 111, 133, 125, 129, 115, 119, and 121. The dashed arrows emanating from, respectively, x2 131, x3 111, x7 115, x8 119, and x9 121 represent the mapping of variables to the data store(s) 105.

As noted above, one or more embodiments advantageously provide a system which computes observations of system variables ("observe" aspect) by running an inference model derived from analytical relations between requested variables and other known variables, and from a mapping between variables and sensor observations; the answer can be, for example, the estimate of the requested observations, or "Variable is unobservable"—missing analytic relations or sensor data required to make query observable are also returned. Thus, in FIG. 1, suppose it is desired to observe x1; x1 can be inferred from the data of x2 and x3. On the other hand, suppose it is desired to observe x5. This variable is unobservable, as it requires data for x5 or x6 or analytic relations on x5 or x6. To address this, register variable x8 by providing an analytic relation 117 to x6 and a mapping of x8 to the data store(s) 105. Furthermore, register variable x9 by providing a mapping of x9 to the data store(s) 105. The system then learns an analytic relation 127; it derives a connection to x5 from semantics (or data) and then learns the analytic relation 127. X9 is now used to observe x5 and x6.

Figure 3:
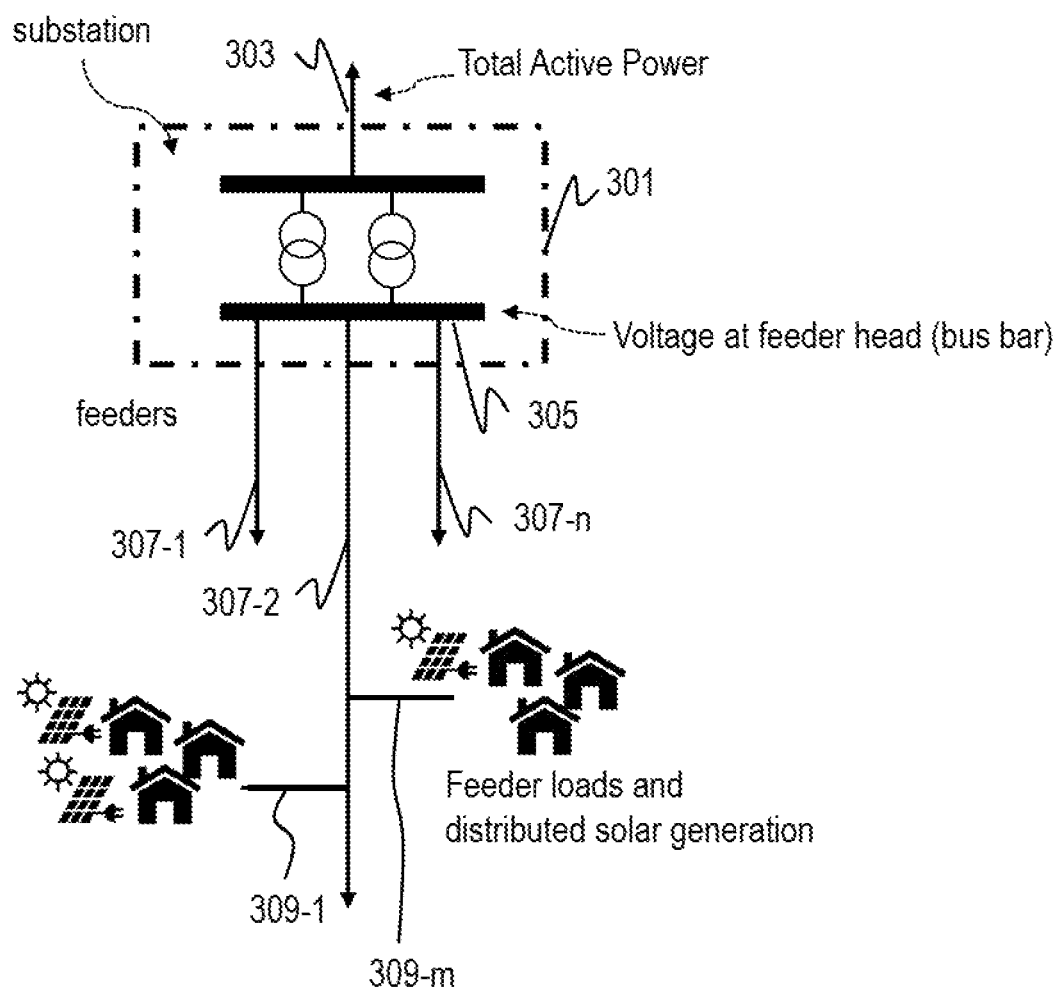
FIG. 3 depicts control of an electric power grid, in accordance with an aspect of the invention.

In one non-limiting example, and referring now to FIG. 3, one or more embodiments of the invention are employed in a power systems observability tool. User A (an electrical grid operator) registers variables of interest for monitoring: (i) Active Power 303 at a substation 301, (ii) Voltage at a feeder head 305, and, optionally, any other desired appropriate quantities (e.g., (iii) Frequency at a coupling point, not shown). The system learns a factor graph model on the variables of interest and other related variables in the system, where each factor corresponds to an analytical function between a subset of the variables (semantic data models are used to guide learning of graphical relations). When User A requests data for active power, the system runs an inference on the factor graph model and returns the estimate of that variable based on all available observations and factor relations. The inference takes care of complementing for missing data in specific variables at certain timestamps. The system returns "unobservable active power at time X" if too many relevant data points are missing.

The system in FIG. 3 includes a number of feeders 307-1, 307-2 ... 307-n off of feeder head 305, each serving one or more feeder loads with distributed solar generation 309-1 ... 309-m. In general, n and m can be different and the value of m can be the same or different for each of the n feeders.

In the first non-limiting example, User B (a planning engineer) is interested in a new variable (reactive power), and knows the analytic relation with already registered variables (active power and voltage). He registers the new variables, as well as a new factor in the graph (analytic function and, optionally, gradient). He usually uses that operation when gaps in reactive power data are missing.

User A now sends a new request for active power, and the system is able to return an answer at time X, because reactive power data are available and are linked to the active power.

Further, in the first non-limiting example, User C (an executive) is interested in quantifying some major variable(s) of the system (e.g. load of electric cars on the system at time X). He registers the variable into the system. If the variable is unobservable, the system pushes a notification to the data engineering team for the request, including possible indications of required data (e.g. data from some car charging stations are not available; analytic relation that estimates electric car load from household load is required; etc.).

In FIG. 3, using inventive techniques to accurately quantify (in recent past or future) the voltage at the feeder head 305; when the voltage is too high (above a threshold), reduce generation (e.g. disconnect some solar generators) to bring voltage within acceptable levels; when the voltage is too low, reduce load (e.g. by controlling consumer loads directly or through demand response programs).

In another non-limiting example, one or more embodiments of the invention are employed in a Crop Growth Prediction tool. The user registers certain state variables, such as climate data (average air temperature, precipitation, etc.), soil data, humus content, etc. and management practices for particular crop such as maize. The user(s) map the known state variables to available data. These can include additional state variables that are not in the set of interest. The system learns the correlation between maize and other similar crops in the same region when there is no information available for maize. When the user submits a query about crop yield of maize, the system runs the model based on all available observations and factor relations. An answer may not be returned if not enough relations are available to answer the query. The system looks for crops that are grown in the same area and similar in nature to maize growth (like rice e.g.) where computations have been carried out by a different user. The correlation between maize and rice growth in the same region is exploited to give information on the expected maize yield using the models for rice yield that the user did not know a priori.

One or more embodiments thus provide systems and/or methods for observability in sensor data fusion, including receiving requests for registration of entities to be observed, and subsequently extending an underlying inference model including of set of entities related to entities to be observed and analytic relations between entities, which are learned from sensor data associated to entities. The systems and/or methods further respond to time-series data requests for registered entities, by running inference(s) on the inference model using sensor data mapped to entities that are part of the inference mode.

In some cases, the entity requested is unobservable with the existing sensor data and inference model, so that, based on the results of the inference, a list of sensor data required for making the inference model observable is derived.

In some instances, a known analytical relation between two semantic entities is received and integrated into the underlying inference model.

In some cases, a query about the sensitivity of entities in the system is received, and the inference model is run so as to derive a quantitative measure of the sensitivity of the semantic entity with respect to all other semantic entities included in the inference model.

One or more embodiments do not require the model of the data to be given and/or do not require domain expertise and/or the specification of many parameters which are difficult to obtain. Further, one or more embodiments advantageously do not require heavy domain expertise and/or complete refactoring of the model inference mechanism for extensions of the model. One or more embodiments do not require the inference model to be given. One or more embodiments learn the model from the data, and/or customize/extend the set of state variables. One or more embodiments advantageously exploit semantic relations, which makes the methods more effective as compared to prior art techniques.

One or more embodiments advantageously maintain and account for a semantic description of the domain; allow the user to request data for a variable; compute requested data from all related sensor data from using a machine-learning inference model; learn quantitative relationships between variables based on related sensor data; and/or allow a user to provide known quantitative relationship between variables. Unlike prior art approaches which only learn qualitative dependencies between important variables in the system from the data, or only learn qualitative dependencies between data points and rules for semantic concepts of abnormal conditions to support system diagnosis, one or more embodiments deal with maintaining a unique inference model on the sensor data with quantitative relationships between the variables, which allows fusing the information from the sensor data to obtain estimates or predictions of any variable of interest.

Given the discussion this far, it will be appreciated that, in general terms, an exemplary method is provided for improving the performance of a sensor data fusion system including a processor 202 coupled to a plurality of sensors 299 (see discussion of FIG. 2 below) and having limited sensor resources. As used herein, a system has limited sensor resources when the sensor resources are inadequate to measure at least one desired quantity at at least one desired time. The method includes initializing the sensor data fusion system by providing access to a data store 105 storing at least one time series of sensor data; a semantic store 103 storing semantic data including system variables, and relations between the system variables; and a mapping (dashed lines in FIG. 1) between the semantic data and the time series of sensor data. Entities, also referred to as variables, are high level concepts it is desired to quantify; relations are relations between the entities/variables. In one or more embodiments, sensors are deployed on the system and measure particular quantities of the system. The mapping indicates which sensor data represents which semantic concepts. A library of semantic concepts could include, for example, electric transformer, power station; the sensor data measures quantities associated with electric power—the mapping associates that sensor data with that power station, e.g.

A further step includes obtaining, from a user (e.g. via keyboard 208, see discussion of FIG. 2 below), a registration of a set of one or more variables of interest defined in the semantic store but for which appropriate data is not available due to the limited sensor resources. The semantic store is essentially like a dictionary defining high-level concepts (variables) that a user may be interested in for a particular domain. While the variables of interest are defined in the semantic store, it may be that there is no data for them at certain times (or no data at all for any time).

Further steps include extending an initially empty inference model 101 with the set of one or more variables of interest, to obtain an extended inference model; obtaining, from the user, a request to observe a given one of the set of one or more variables of interest at a given timestamp; responsive to the request, retrieving time series data for the set of registered variables in the extended inference model; and running the extended inference model with the retrieved data to obtain an estimate (for example, an optimal estimate) of the given one of the set of variables at the given timestamp.

In some cases, no analytical relations exist to link the set of one or more variables of interest to the variables in the semantic data store, and the extending of the inference model includes navigating the semantic store 103 to identify new relationships; and associating a parametric relation to each of the new relationships. A further step includes learning parameters of the new relationships by extracting historical data from the at least one time series of sensor data.

In some cases, in the associating sub-step, the parametric relation includes at least one of a joint probability density and a conditional probability density.

In some instances, when data for at least some of the variables of interest with unknown parameters in the parametric relation is not available, further steps can include flagging the at least some of the variables of interest as unobservable; and obtaining relations from the user for the unobservable variables.

On the other hand, in some instances, when data for at least some of the variables of interest with unknown parameters in the parametric relation is not available, further steps include flagging the at least some of the variables of interest as unobservable; and obtaining from the user a mapping from variable to data from a new sensor. Refer to the above discussion wherein, based on the results of the inference, a list of sensor data required for making the inference model observable is derived.

In some embodiments, the inference model includes a probabilistic graphical model, and the learning of the parameters of the new relationships by extracting the historical data from the at least one time series of sensor data includes using a maximum likelihood technique.

Some embodiments further include obtaining, from the user, registration of known analytic relations between any subset of variables in the semantic store (not necessarily the registered variables). In such cases, the extending of the inference model further includes extending the initially empty inference model with the known analytic relations, to obtain the extended inference model. Refer to the above discussion where a known analytical relation between two semantic entities is received and integrated into the underlying inference model. Non-limiting examples of the known analytic relations include at least one of functional relations and parametric joint densities. For example, if, in the joint density, there is a Gaussian distribution, the parameters would be a mean and a covariance matrix.

In some cases, the inference model includes a probabilistic graphical model, and the running of the extended inference model with the retrieved data includes running using belief propagation.

In some cases, the extended inference model is run to determine sensitivity of at least one of the system variables to at least another one of the system variables. See above discussion wherein a query about the sensitivity of entities in the system is received. The inference model is run so as to derive a quantitative measure of the sensitivity of the semantic entity with respect to all other semantic entities included in the inference model. For example, it may be desired to check the sensitivity of the system to changes in certain variables. If a certain value of a given variable is assumed, the system allows one to determine the effect of same on the other variables. If power generation of a unit is predicted, it is possible to predict the effect of same on voltage at various points. In another example, suppose load increase in a certain area is predicted due to development. The system can estimate the effect on certain other pertinent quantities and plan for new plant and equipment to handle the increased load. The electrical grid can be controlled and/or reconfigured based on the results.

In another aspect, a computer (e.g. 212, see discussion of FIG. 2 below) implements a sensor data fusion system. The computer includes a memory 204; and at least one processor 202, coupled to the memory, and having interfaces with a plurality of sensors 299 having limited sensor resources. The at least one processor is operative to initialize the sensor data fusion system by providing access to a data store 105 (e.g. via network interface 214 or in non-volatile part of memory 205) storing at least one time series of sensor data; a semantic store 103 (e.g. via network interface 214 or in non-volatile part of memory 205) storing semantic data including system variables, and relations between the system variables; and a mapping (dashed lines in FIG. 1) between the semantic data and the time series of sensor data. The at least one processor is further operative to obtain, from a user, a registration of a set of one or more variables of interest defined in the semantic store but for which appropriate data is not available due to the limited sensor resources; to extend an initially empty inference model 101 with the set of one or more variables of interest, to obtain an extended inference model; to obtain, from the user, a request to observe a given one of the set of one or more variables of interest at a given timestamp; responsive to the request, to retrieve time series data for the set of registered variables in the extended inference model; and to run the extended inference model with the retrieved data to obtain an estimate of the given one of the set of variables at the given timestamp.

In some instances, no analytical relations exist to link the set of one or more variables of interest to the variables in the semantic data store; and the at least one processor is operative to extend the inference model by: navigating the semantic store 103 to identify new relationships; and associating a parametric relation to each of the new relationships. The at least one processor is further operative to learn parameters of the new relationships by extracting historical data from the at least one time series of sensor data. The parametric relation can include, for example, at least one of a joint probability density and a conditional probability density. In some instances, data for at least some of the variables of interest with unknown parameters in the parametric relation is not available. In some such instances, the at least one processor is further operative to flag the at least some of the variables of interest as unobservable; and obtain relations from the user for the unobservable variables. On the other hand, in some such instances, the at least one processor is further operative to: flag the at least some of the variables of interest as unobservable; and obtain from the user a mapping from variable to data from a new sensor.

In a non-limiting example, the inference model includes a probabilistic graphical model, and the learning of the parameters of the new relationships by extracting the historical data from the at least one time series of sensor data includes using a maximum likelihood technique.

In some cases, the at least one processor is further operative to obtain, from the user, registration of known analytic relations between any subset of variables in the semantic store, and the extending of the inference model further includes extending the initially empty inference model with the known analytic relations, to obtain the extended inference model.

Figure 2:
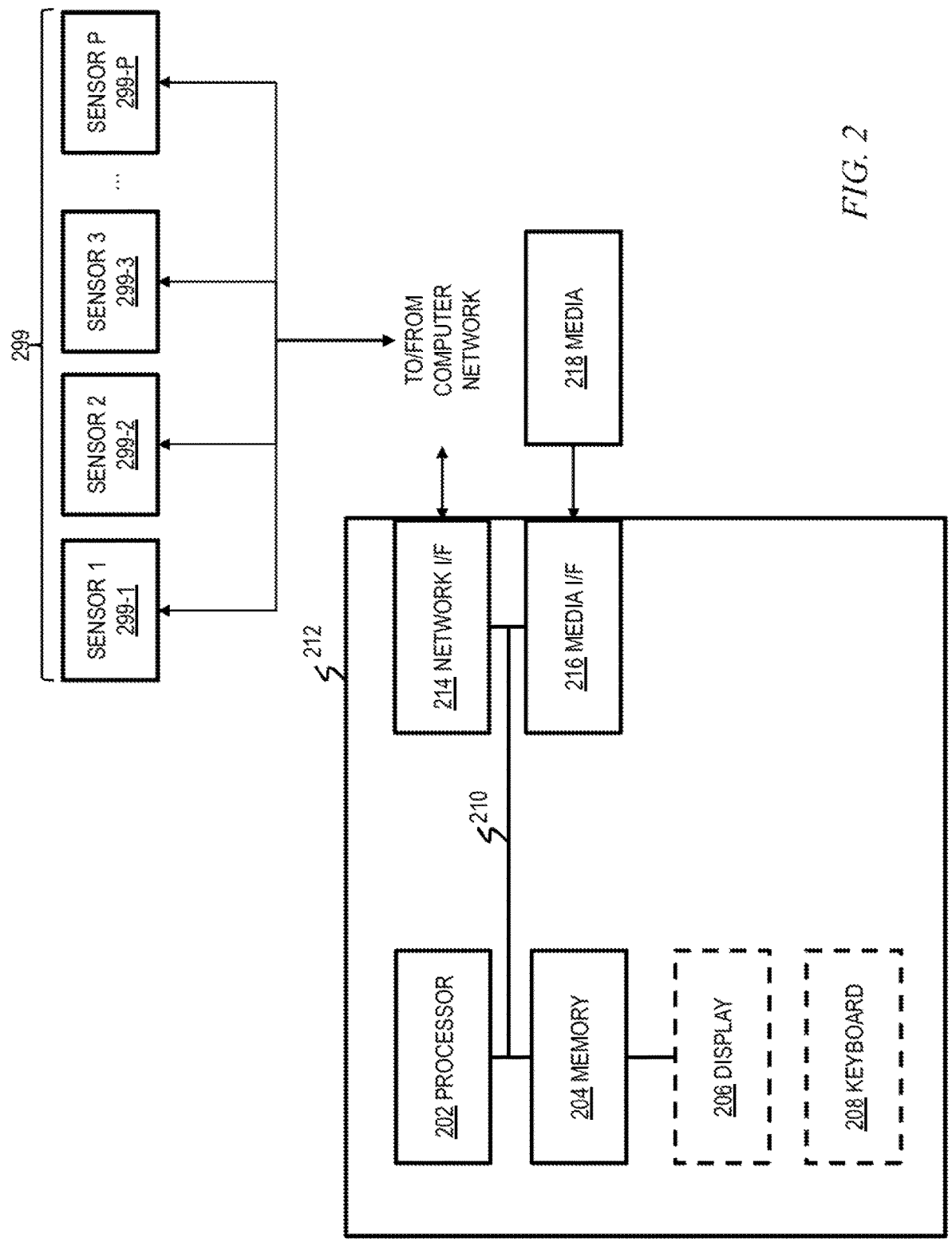
FIG. 2 depicts a computer system implementing a sensor data fusion system, according to an aspect of the invention.

In still another aspect, referring also to FIG. 3, and still referring to FIGS. 1 and 2, an exemplary method for controlling the operation of an electrical power system includes initializing a sensor data fusion system including a processor coupled to a plurality of sensors, and having limited sensor resources, by providing access to a data store storing at least one time series of sensor data; a semantic store storing semantic data including system variables, and relations between the system variables; and a mapping between the semantic data and the time series of sensor data. At least one of the system variables includes voltage at a feeder head 305 in a substation 301; the feeder head 305 is coupled to a plurality of feeders 307-1, 307-2, 307-$n$ with loads and distributed generation capability 309-1 . . . 309-$m$. A further step includes obtaining, from a user, a registration of a set of one or more variables of interest defined in the semantic store but for which appropriate data is not available due to the limited sensor resources. The set of one or more variables of interest includes at least the voltage at the feeder head 305.

Further steps include extending an initially empty inference model with the set of one or more variables of interest, to obtain an extended inference model; and obtaining, from the user, a request to observe a given one of the set of one or more variables of interest at a given timestamp. The given one of the set of one or more variables of interest includes at least the voltage at the feeder head 301. Responsive to the request, a further step includes retrieving time series data for the set of registered variables in the extended inference model. Even further steps include running the extended inference model with the retrieved data to obtain an estimate of the given one of the set of variables at the given timestamp; and controlling the operation of the electrical power system in accordance with the estimate of the given one of the set of variables at the given timestamp.

When, for example, the extended inference model indicates that the voltage at the feeder head at the given timestamp exceeds a threshold value (say, a nominal value plus a tolerance), the controlling of the operation of the electrical power system can include taking at least some of the distributed generation capability offline. On the other hand, when for example, the extended inference model indicates that the voltage at the feeder head at the given timestamp is below a threshold value (say, a nominal value minus a tolerance), the controlling of the operation of the electrical power system can include placing at least some of the distributed generation capability online and/or reducing load.

In instances such as just described, the user can be an electrical grid operator. The operator looks at day-to-day operation of the electrical grid and takes action if anything is out of tolerance. The operator will want to monitor certain quantities about the power grid for a given area—for example, active power at the substation; voltage at the feeder head/bus bar in the substation; and the frequency at the same point and/or at the boundary with another operator, for example. The quantities it is desired to monitor are input from the user; the system learns a model based on the semantics and the available sensor data. Whenever the user requests data for particular quantities he or she wants to monitor, the system can provide an estimate. Suppose there is a gap in the actual data for the quantity of interest, or even that there is no specific sensor data for that quantity. The system looks for data from nearby sensors and/or employs heuristics to derive the desired quantity. For example, the utility operator monitors voltage which needs to be within a nominal value plus or minus 1%, and the voltage is found to be outside that value. If too high, reduce generation—disconnect some solar panels. If too low, decrease load via demand reduction (directly by shutting down non-essential circuits or via a demand reduction program) or bring more generating capacity on line.

The skilled artisan will appreciate that reactive power comes from the theory of alternating current (AC) because loads are typically not purely resistive. The reactive power (and not merely the active power) is typically of interest in an AC electric grid. In particular, the complex power, S, is given by the real average power, P, plus j (the imaginary unit, square root of minus one) times the reactive power, Q.

In another aspect, knowledge transfer can be facilitated—some experts may know how to calculate values for desired quantities for which direct measurements are not available. Suppose it is desired to know reactive power; suppose it is known how to compute same based on heuristics from active power and voltage. In one or more embodiments, register that information into the system. Suppose as above the system responds that it cannot compute a desired quantity (e.g., the active power). When expert knowledge is input and/or a new data source is utilized, now it is possible to obtain an answer.

One or more embodiments cut electrical load or bring a new generator, solar collector, and/or peak load/supplemental generation device online. One or more embodiments use the system to infer the value of a variable for a future time or for a past or current time for which there is no direct data. One or more embodiments are thus useful for estimating quantities for which there is no directly measured data at all (or at least no directly measured data at the time of interest). One or more embodiments improve the performance of a sensor data fusion system under such conditions.

In still another aspect, a computer (e.g. 212, see discussion of FIG. 2 below) implements a sensor data fusion system that controls the operation of an electrical power system.

Exemplary System

As will be appreciated by one skilled in the art, and as discussed in detail elsewhere herein, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects.

One or more embodiments of the invention, or elements thereof, can be implemented in the form of an apparatus including a memory and at least one processor that is coupled to the memory and operative to perform exemplary method steps.

One or more embodiments can make use of software running on a processor of a computer implementing a sensor data fusion system and/or some other general purpose computer or workstation. With reference to FIG. 2, such an implementation might employ, for example, a processor 202, a memory 204, and an input/output interface formed, for example, by a display 206 and a keyboard 208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 202, memory 204, and input/output interface such as display 206 and keyboard 208 can be interconnected, for example, via bus 210 as part of a data processing unit 212. Suitable interconnections, for example via bus 210, can also be provided to a network interface 214, such as a network card, which can be provided to interface with a computer network, and to a media interface 216, such as a diskette or CD-ROM drive, which can be provided to interface with media 218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 202 coupled directly or indirectly to memory elements 204 through a system bus 210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 208, displays 206, pointing devices, and the like) can be coupled to the system either directly (such as via bus 210) or through intervening I/O controllers (omitted for clarity).

Network adapters such as network interface 214 may also be coupled to the system to enable the data processing system to become coupled to other data processing systems or remote printers or storage devices through intervening private or public networks. Modems, cable modem and Ethernet cards are just a few of the currently available types of network adapters.

A plurality of sensors 299-1, 299-2, 299-3 . . . 299-$p$ (collectively, 299) are coupled to the processor 202; for example, via the network interface 214 and computer network, via analog-to-digital converters, or the like. The sensors could include sensors to measure voltage, current, power, temperature, frequency, and the like.

As used herein, including the claims, a "server" includes a physical data processing system (for example, system 212 as shown in FIG. 2) running a server program. It will be understood that such a physical server may or may not include a display and keyboard.

Aspects of the invention can be used in many different scenarios; one non-limiting example is control of an electrical power grid or the like.

It should be noted that any of the methods described herein can include an additional step of providing a system comprising distinct software modules embodied on a computer readable storage medium; the modules can include, for example, any or all of the elements depicted in the block diagrams and/or described herein. For example, referring again to FIG. 1, the modules can implement the data stores, semantic stores, and inference model, and related aspects. The method steps can then be carried out using the distinct software modules/routines and/or sub-modules/subroutines of the system, as described above, executing on one or more hardware processors 202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving the performance of a sensor data fusion system comprising a processor coupled to a plurality of sensors and having limited sensor resources, said method comprising:
    initializing said sensor data fusion system by providing access to:
        a data store storing at least one time series of sensor data;
        a semantic store storing semantic data comprising system variables, and relations between said system variables; and
        a mapping between said semantic data and said time series of sensor data;
    obtaining, from a user, a registration of a set of one or more variables of interest defined in said semantic store but for which appropriate data is not available due to said limited sensor resources;
    extending an initially empty inference model with said set of one or more variables of interest, to obtain an extended inference model;
    obtaining, from said user, a request to observe a given one of said set of one or more variables of interest at a given timestamp;
    responsive to said request, retrieving time series data for the set of registered variables in said extended inference model; and
    running said extended inference model with said retrieved data to obtain an estimate of said given one of said set of variables at said given timestamp, wherein:
    no analytical relations exist to link said set of one or more variables of interest to said variables in said semantic data store; and
    said extending of said inference model comprises:
        navigating said semantic store to identify new relationships; and
        associating a parametric relation to each of said new relationships;
    further comprising learning parameters of said new relationships by extracting historical data from said at least one time series of sensor data, wherein, in said associating sub-step, said parametric relation comprises at least one of a joint probability density and a conditional probability density and wherein data for at least some of said variables of interest with unknown parameters in said parametric relation is not available, further comprising:
    flagging said at least some of said variables of interest as unobservable; and
    obtaining relations from said user for said unobservable variables.

2. The method of claim 1, wherein said inference model comprises a probabilistic graphical model, and wherein said learning of said parameters of said new relationships by extracting said historical data from said at least one time series of sensor data comprises using a maximum likelihood technique.

3. The method of claim 1, further comprising obtaining, from said user, registration of known analytic relations between any subset of variables in the semantic store, wherein said extending of said inference model further comprises extending said initially empty inference model with said known analytic relations, to obtain said extended inference model.

4. The method of claim 3, wherein, in said obtaining from said user of said registration of said known analytic relations, said known analytic relations comprise at least one of functional relations and parametric joint densities.

5. The method of claim 1, wherein said inference model comprises a probabilistic graphical model, and wherein said running of said extended inference model with said retrieved data comprises running using belief propagation.

6. The method of claim 1, further comprising running said extended inference model to determine sensitivity of at least one of said system variables to at least another one of said system variables.

7. A method for controlling the operation of an electrical power system, said method comprising:
    initializing a sensor data fusion system comprising a processor coupled to a plurality of sensors, and having limited sensor resources, by providing access to:
        a data store storing at least one time series of sensor data;
        a semantic store storing semantic data comprising system variables, and relations between said system variables; and
        a mapping between said semantic data and said time series of sensor data;
        wherein at least one of said system variables comprises voltage at a feeder head in a substation, said feeder head being coupled to a plurality of feeders with loads and distributed generation capability;
    obtaining, from a user, a registration of a set of one or more variables of interest defined in said semantic store but for which appropriate data is not available due to said limited sensor resources, said set of one or more variables of interest comprising at least said voltage at said feeder head;
    extending an initially empty inference model with said set of one or more variables of interest, to obtain an extended inference model;
    obtaining, from said user, a request to observe a given one of said set of one or more variables of interest at a given timestamp, said given one of said set of one or more variables of interest comprising at least said voltage at said feeder head;
    responsive to said request, retrieving time series data for the set of registered variables in said extended inference model;

running said extended inference model with said retrieved data to obtain an estimate of said given one of said set of variables at said given timestamp; and controlling said operation of said electrical power system in accordance with said estimate of said given one of said set of variables at said given timestamp, wherein:

no analytical relations exist to link said set of one or more variables of interest to said system variables in said semantic data store; and said extending of said inference model comprises:
  navigating said semantic store to identify new relationships; and
  associating a parametric relation to each of said new relationships;

further comprising learning parameters of said new relationships by extracting historical data from said at least one time series of sensor data, wherein, in said associating sub-step, said parametric relation comprises at least one of a joint probability density and a conditional probability density and wherein data for at least some of said variables of interest with unknown parameters in said parametric relation is not available, further comprising:

flagging said at least some of said variables of interest as unobservable; and obtaining relations from said user for said unobservable variables.

8. The method of claim 7, wherein:

said extended inference model indicates that said voltage at said feeder head at said given timestamp exceeds a threshold value; and said controlling of said operation of said electrical power system comprises taking at least some of said distributed generation capability offline.

9. The method of claim 7, wherein:

said extended inference model indicates that said voltage at said feeder head at said given timestamp is below a threshold value; and said controlling of said operation of said electrical power system comprises at least one of placing at least some of said distributed generation capability online and reducing load.

10. A computer implementing a sensor data fusion system, said computer comprising:

a memory; and at least one processor, coupled to said memory, and having interfaces with a plurality of sensors having limited sensor resources, said at least one processor being operative to:

initialize said sensor data fusion system by providing access to:
    a data store storing at least one time series of sensor data;
    a semantic store storing semantic data comprising system variables, and relations between said system variables; and
    a mapping between said semantic data and said time series of sensor data;

obtain, from a user, a registration of a set of one or more variables of interest defined in said semantic store but for which appropriate data is not available due to said limited sensor resources;

extend an initially empty inference model with said set of one or more variables of interest, to obtain an extended inference model;

obtain, from said user, a request to observe a given one of said set of one or more variables of interest at a given timestamp;

responsive to said request, retrieve time series data for the set of registered variables in said extended inference model; and run said extended inference model with said retrieved data to obtain an estimate of said given one of said set of variables at said given timestamp, wherein:

no analytical relations exist to link said set of one or more variables of interest to said variables in said semantic data store; and said at least one processor is operative to extend said inference model by:
  navigating said semantic store to identify new relationships; and
  associating a parametric relation to each of said new relationships; and said at least one processor is further operative to learn parameters of said new relationships by extracting historical data from said at least one time series of sensor data wherein said parametric relation comprises at least one of a joint probability density and a conditional probability density and wherein data for at least some of said variables of interest with unknown parameters in said parametric relation is not available, and wherein said at least one processor is further operative to:

flag said at least some of said variables of interest as unobservable; and obtain from said user a mapping from variable to data from a new sensor.

11. The computer implementing the sensor data fusion system of claim 10, wherein said inference model comprises a probabilistic graphical model, and wherein said learning of said parameters of said new relationships by extracting said historical data from said at least one time series of sensor data comprises using a maximum likelihood technique.

12. The computer implementing the sensor data fusion system of claim 10, wherein said at least one processor is further operative to obtain, from said user, registration of known analytic relations between any subset of variables in the semantic store, and wherein said extending of said inference model further comprises extending said initially empty inference model with said known analytic relations, to obtain said extended inference model.

13. The computer implementing the sensor data fusion system of claim 10, wherein at least one of said system variables comprises voltage at a feeder head in a substation of an electrical power system, said feeder head being coupled to a plurality of feeders with loads and distributed generation capability, said set of one or more variables of interest comprising at least said voltage at said feeder head, said given one of said set of one or more variables of interest comprising at least said voltage at said feeder head, said at least one processor being further operative to control operation of said electrical power system in accordance with said estimate of said given one of said set of variables at said given timestamp.

* * * * *